United States Patent
Silcock et al.

(10) Patent No.: US 8,900,391 B2
(45) Date of Patent: Dec. 2, 2014

(54) AUTOMATED RESIN AND FIBER DEPOSITION FOR RESIN INFUSION

(75) Inventors: Michael D. Silcock, Melbourne (AU); Christopher A. Howe, Glen Waverley (AU); Brice A. Johnson, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/168,990

(22) Filed: Jun. 26, 2011

(65) Prior Publication Data

US 2012/0325398 A1    Dec. 27, 2012

(51) Int. Cl.
*B29C 70/38* (2006.01)
*B29C 70/44* (2006.01)

(52) U.S. Cl.
CPC .................................. *B29C 70/386* (2013.01)
USPC ...................... 156/166; 156/307.7; 156/309.6

(58) Field of Classification Search
USPC .............................. 156/64, 166, 307.7, 309.6
See application file for complete search history.

(56) References Cited

U.S. PATENT DOCUMENTS

| | | | |
|---|---|---|---|
| 4,622,091 A | 11/1986 | Letterman | |
| 4,699,683 A | 10/1987 | McCowin | |
| 5,045,609 A * | 9/1991 | Lee et al. | 525/438 |
| 5,117,348 A * | 5/1992 | Romero et al. | 700/57 |
| 7,063,118 B2 * | 6/2006 | Hauber et al. | 156/486 |
| 7,137,182 B2 * | 11/2006 | Nelson | 29/428 |
| 7,213,629 B2 | 5/2007 | Ledet et al. | |
| 7,293,590 B2 * | 11/2007 | Martin | 156/361 |
| 7,334,782 B2 | 2/2008 | Woods et al. | |
| 7,681,615 B2 | 3/2010 | McCowin | |
| 2003/0104156 A1 * | 6/2003 | Osada et al. | 428/40.1 |
| 2005/0073076 A1 | 4/2005 | Woods et al. | |
| 2006/0048881 A1 * | 3/2006 | Evans et al. | 156/64 |
| 2006/0073309 A1 * | 4/2006 | Hogg | 428/156 |
| 2007/0029030 A1 | 2/2007 | McCowin | |
| 2009/0197050 A1 * | 8/2009 | Pridie | 428/174 |

FOREIGN PATENT DOCUMENTS

| | | |
|---|---|---|
| EP | 2540480 A1 | 1/2013 |
| GB | 2268705 A | 1/1994 |
| WO | WO2008017420 A1 | 2/2008 |

OTHER PUBLICATIONS

Cytec Engineered Materials, "CYCOM 5320 Toughened Epoxy for Structural Applications Out-of-Autoclave Manufacturing," http://www.cytec.com/engineered-materials/Products/Datasheets/CYCOM%205320Rev1-3.pdf, Mar. 18, 2009, 9 pages.

Stewart, "New Prepreg Materials Offer Versatility, Top Performance," Reinforced Plastics, vol. 53, No. 5, http://www.reinforcedplastics.com/view/1839/new-prepreg-materials-offer-versatility-top-performance/, May 21, 2009, 4 pages.

(Continued)

*Primary Examiner* — Michael Tolin
(74) *Attorney, Agent, or Firm* — Yee & Associates, P.C.

(57) ABSTRACT

A composite structure is fabricated by laying up at least one ply of fiber reinforcement and at least one layer of resin on a tool. The resin film layer is formed by laying strips of resin film. The fiber reinforcement is infused with resin from the resin layer.

15 Claims, 7 Drawing Sheets

(56) References Cited

OTHER PUBLICATIONS

New Prepreg materials offer versatility, top performance. Stewart, R. Reinforced Plastics. vol. 53, Issue 5, Jun.-Jul. 2009. Cytec CVT 5320 Out-of-Autoclave Prepreg—http://www.cytec.com/engineered-materials/products/Datasheets/CYCOM%203.pdf. http://www.cytec.com/engineered-materials/products/Datasheets/CYCOM%205320Rev1-3.pdf.

European Search Report, dated Oct. 24, 2012, regarding Application No. EP12167277, 5 pages.

* cited by examiner

AUTOMATED RESIN AND FIBER DEPOSITION FOR RESIN INFUSION

TECHNICAL FIELD

The present disclosure generally relates to the fabrication of composite structures, and deals more particularly with a method and apparatus for deposition of fiber reinforcements and resin film used to infuse the reinforcements with resin.

BACKGROUND

Large composite structures may be fabricated using automated equipment such as automatic tape laying machines and automatic fiber placement machines. These automated machines layup plies over a tool by laying down multiple courses of prepreg tape or tows. Automated layup of prepregs has several disadvantages, including the relatively short shelf-life of the prepreg materials, potential gumming of tape placement heads, the need for capital intensive autoclaves for curing and limitations in the variety of prepreg formats that are available.

Some of the disadvantages mentioned above may be overcome using liquid molding techniques such as, without limitation, resin infusion of fiber preforms. However, the resin infusion process also has certain disadvantages, including limited flexibility in controlling the location and deposition of resin into conventional tooling and difficulties in infusing high modulus and highly toughened resins into large structures. Also, resin infusion is time consuming and requires relatively complex bagging arrangements and resin transfer systems and may require technicians to come into direct contact with resins. Furthermore, resin infusion may be relatively costly in terms of material waste and consumables.

In order to improve resin distribution and reduce processing times, it has been proposed to infuse fiber preforms using pieces of resin film that are sectioned from a large sheet and placed on a mandrel followed by a dry preform. A relatively complex dam and various consumables are required in order to control resin flow. Accordingly, the resin film infusion process and equipment may not be well suited to higher production environments where automation is desirable.

Resin spray techniques have been employed in which resin is deposited using a spray gun by automated means onto a tool. However this process requires that the tool be maintained at low temperatures in order to control the change of state in the resin from a liquid to a solid when transferred from the spray gun to the tool.

Accordingly, there is a need for a method of fabricating composite structures, particularly large scale structures, using a resin infusion process that reduces costs and is well suited to automation. There is also a need for a method and apparatus for automated deposition of resin films that allow high laydown rates, improved control over resin quality, location and distribution and which permits the use of high modulus and toughened resins.

SUMMARY

The disclosed method and apparatus provide automated deposition of resin films that may be used in resin infusion of fiber preforms to produce large scale composite structures. The disclosed embodiments allow deposition of resin in a tailored format meeting design and process requirements, while reducing weight and achieving lean utilization of energy and materials. The disclosed automated resin deposition process may reduce recurring costs while eliminating processing steps previously required to prepare materials. Improved quality and performance may be achieved through highly repeatable automation. Material waste may also be reduced while minimizing or eliminating direct contact between personnel and resins. The need for autoclave processing may be eliminated as well as the need for resin pots, plumbing and resin handling facilities.

According to one disclosed embodiment, a method is provided of fabricating a composite structure. The method comprises feeding a resin film to a compaction roller, moving the compaction roller along the surface of the substrate, and compacting the film onto and/or into the substrate as the roller moves along the substrate. Feeding the resin film includes guiding a strip of the resin film to the compaction roller, and cutting the resin film to the desired lengths as the compaction roller moves along the substrate surface. The method may further comprise feeding a fiber reinforcement to a compaction roller, and compacting the fiber reinforcement on the substrate as the roller moves along the substrate. The fiber reinforcement and the resin film may be fed to the compaction roller substantially simultaneously. An automatically controlled manipulator may be used to move the compaction roller along the substrate and place the strips of resin film substantially edge-to-edge.

According to another disclosed embodiment, a method is provided of fabricating a composite structure, comprising separately feeding a fiber reinforcement and a resin film to a compaction roller. The method also includes moving the compaction roller along the surface of the substrate, and compacting resin film and the fiber reinforcement against the substrate using the compaction roller. Separately feeding the fiber reinforcement and the resin film may include drawing strips of the fiber reinforcement and the resin film from spools and guiding the strips to the compaction roller. In one embodiment, the fiber reinforcement is fed between the substrate and the resin film, while in another embodiment the resin film is fed between the substrate and the fiber reinforcement. The method further comprises cutting lengths of the fiber reinforcement and resin film as the compaction roller moves along the substrate surface.

According to a further embodiment, a method is provided of fabricating a composite structure. The method comprises assembling a layup on a tool, including laying up at least one ply of fiber reinforcement on the tool and laying up at least one layer of resin on the tool by laying up strips of a resin film. The method further comprises infusing the fiber reinforcement with resin from the resin layer. Laying up the strips of resin film may include using an end effector to cut the resin film to desired lengths, and using the end effector to compact the film strips against the tool. Infusing the fiber reinforcement may include sealing a vacuum bag over the layup, evacuating the vacuum bag and applying heat to the layup.

According to still a further embodiment, apparatus is provided for fabricating a composite structure, comprising an end effector adapted to be moved along the surface of a substrate, and a supply of resin film on the end effector. The apparatus further comprises a compaction roller on the end effector for compacting the resin film against the substrate as the end effector moves along the substrate surface. The film supply may include a spool of resin film, and the end effector may include a guide for guiding the resin film from the spool to the compaction roller, and a cutter for cutting the resin film to the desired lengths. The apparatus may also include a spool of fiber reinforcement on the end effector and a guide for guiding the fiber reinforcement from the spool to the compaction roller.

BRIEF DESCRIPTION OF THE ILLUSTRATIONS

DETAILED DESCRIPTION

Figure 1:
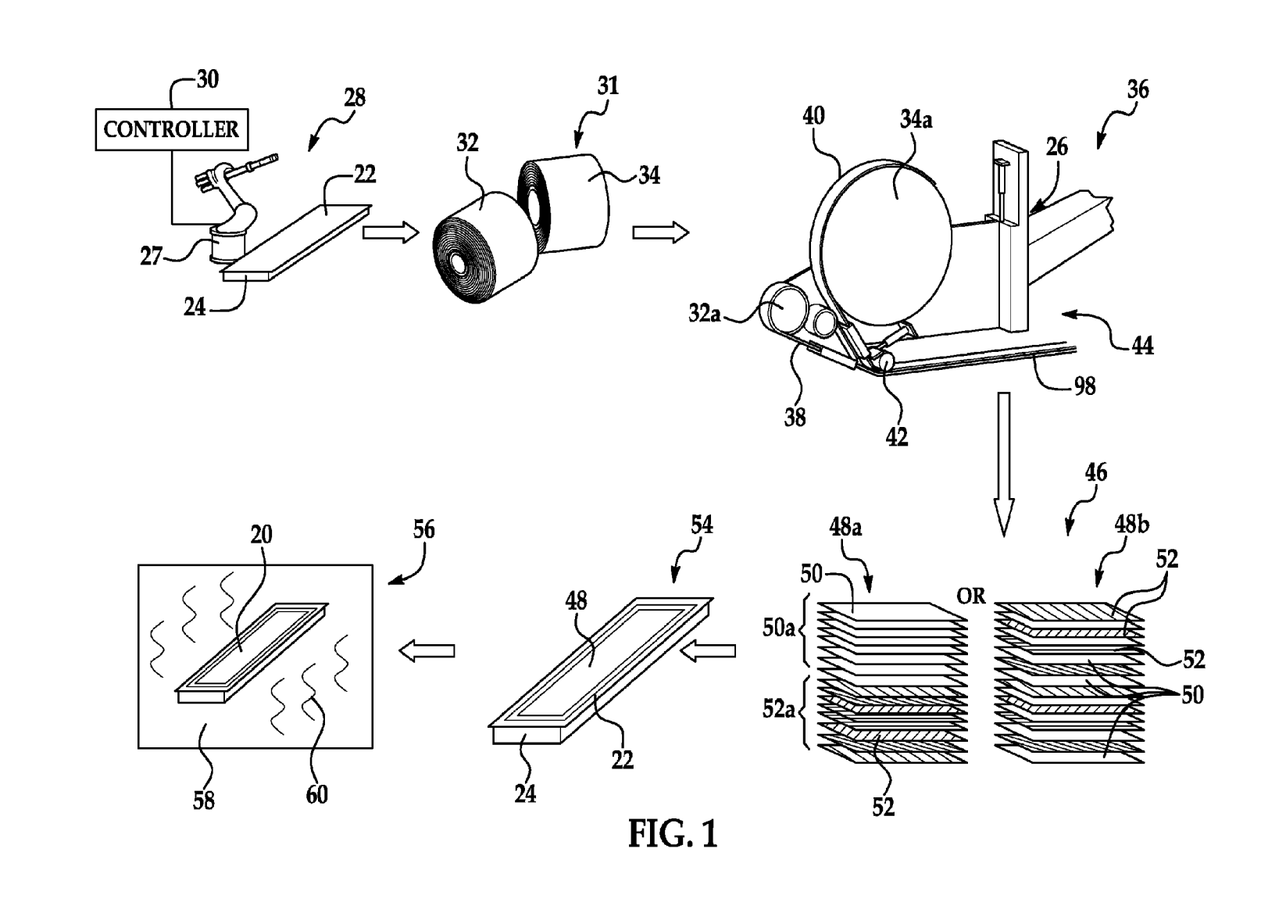
FIG. 1 is an illustration of a diagram showing the steps of a method of fabricating a composite structure using automated resin film deposition.

Referring first to FIG. 1 a composite structure 20 may be fabricated using standard or non-standard tooling 22 and automated layup. In the illustrated example, the composite structure 20 is a flat panel formed on substantially flat tooling 22 supported on a tool base 24, however, other tooling 22 geometries may be employed, including those having simple or complex contours. As shown at 28, a manipulator 27 comprising a robot, gantry system or other handling system is automatically controlled by a controller 30 and includes an end effector 26 for laying up multiple layers 50 and plies 52 on tooling 22.

As shown at 31, the layers 50 and plies 52 are laid up using spools 32, 34 of continuous resin film and dry fiber reinforcement, respectively. The resin film may be selected to achieve effective resin distribution over and impregnation of the dry fiber reinforcement, using robotic processes. The resin film may be a thermoset such, such as, without limitation, a thermoset epoxy bismaleimide or benzoxazine, alternatively however the resin film may be a thermoplastic or a combination of a thermoset and thermoplastic. The resin film may contain toughening agents, including organic or inorganic fillers. The reinforcement may be any continuous fiber format. The resin film is calculated to provide a desired areal weight, thickness, physical state and chemical state in order to meet processing requirements for achieving effective deposition, consolidation, cure and laminate properties.

The spools 32, 34 are respectively loaded into creels 32a, 34a which are mounted on the end effector 26 shown at 36. As the end effector 26 is moved over the tool 22 by the manipulator 27, strips 38, 40 of resin film and dry fiber respectively are drawn from the creels 32a, 34a and are fed to a compaction roller 42, in substantially aligned, overlapping relationship to each other. The compaction roller 42 compacts the overlapping strips 38, 40 onto a substrate 44 which may comprise any suitable supporting surface, such as, without limitation, the tooling 22 or an underlying layer 50 or ply 52 that has been previously laid up either manually or automatically by the end effector 26. The end effector 26 lays up courses 98 of the strips 38, 40 in edge-to-edge generally parallel relationship to each other. As will be discussed below, the end effector 26 may be used to lay down double layer courses 98 comprising a layer of resin film 38, and a layer (ply) of fiber reinforcement 40 as discussed above, or alternatively, may be used to lay down a single layer course of either the resin film 38 or the fiber reinforcement 40.

As shown at 46, the end effector 26 may be used to assemble a layup 48a comprising a stack 50a of individual resin layers 50 that are laid up over a stack 52a of fiber reinforcement plies 52. Plies 52 may have different fiber orientations, according to a predetermined ply schedule for a particular structure. Alternatively, a layup 48b may be formed by alternately laying up interleafed layers 50 of resin film 38 and plies 52 of fiber reinforcement 40, using the double layer strips 98 described previously. After the layup 48 has been assembled on tooling 22, as shown at 54, the layup 48 may be compacted and cured using out-of-autoclave processes, such as vacuum bag processing and oven curing. For example, referring to FIG. 2, a layup 48a assembled on tooling 22 comprises a stack 50a of resin layers 50 laid up over a stack 52a of fiber reinforcement plies 52 of desired fiber orientations. Other layers 62 of consumables, such as breathers, peel plies, etc. are placed over the layup 48a. A vacuum bag 49 is placed over the layup 48a and sealed to the tooling 22 by edge seals 64 which may comprise conventional sealant tape. A suitable vacuum source 66 is coupled with the bag 49 in order to evacuate the bag 49 of air, moisture and volatiles.

Figure 2:
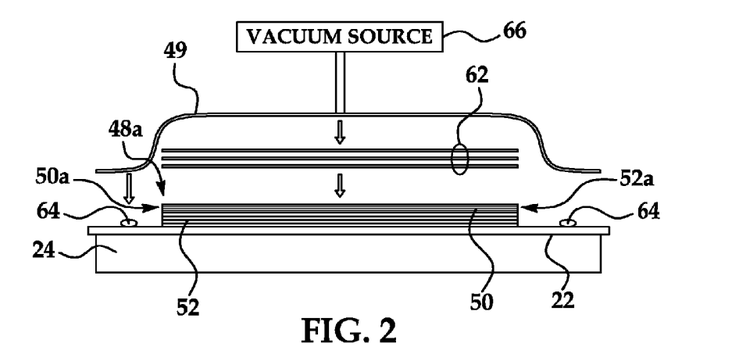
FIG. 2 is an illustration of a cross sectional view of a vacuum bagged layup assembly used in the fabrication method shown in FIG. 1.

Returning to FIG. 1, as shown at 56, the vacuum bagged layup 48a is placed in an oven 58 where heat 60 is used to cure the layup 48a. Other equipment may be employed to heat the layup 48a, such as, without limitation, autoclaves, microwaves, integrally heated molds, etc., all not shown. During the curing process, the heat 60 melts the resin layers 50, allowing a controlled amount of resin to flow into the fiber reinforcement plies 52 substantially uniformly, thereby infusing the fiber reinforcement with resin as compaction pressure is applied to the layup 48a through the vacuum bag 49 (FIG. 2).

Figure 3:
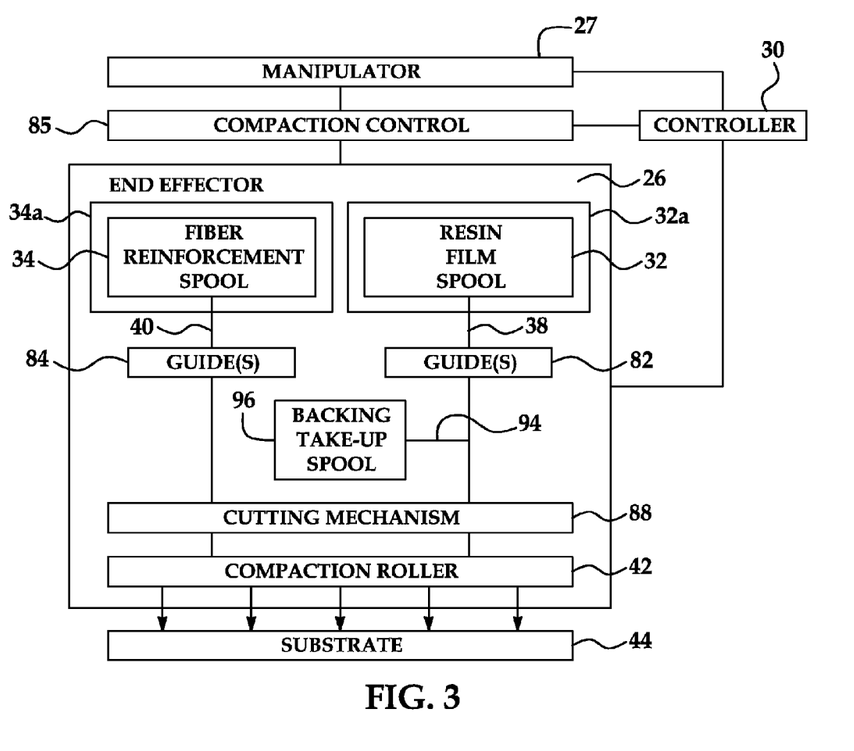
FIG. 3 is an illustration of a functional block diagram of apparatus for laying up plies of the layups shown in FIG. 1.

FIG. 3 broadly illustrates the functional components of apparatus that may be used in carrying out the method of fabricating composite structures shown in FIG. 1. The end effector 26 is mounted on a manipulator 27 and includes a compaction control 85 which controls the amount of compaction pressure applied by the compaction roller 42. A controller 30, which may comprise any suitable programmed computer, controls the operation of the manipulator 27, the compaction control 85 and functions of the end effector 26. The end effector 26 includes a resin film spool 32 and a fiber reinforcement spool 34 respectively contained in creels 32a, 34a. Strips 38, 40 of the resin film and fiber reinforcement are respectively directed by guides 82, 84 to a cutting mechanism 88 and compaction roller 42. The cutting mechanism 88 cuts the strips 38, 40 to the desired length as the strips 38, 40 are being compacted onto a substrate 44 by the compaction roller 42. The end effector 26 may further includes a backing paper take-up reel 96 which takes up a backing paper 94 on the resin film strip 38 as the backing paper 94 is peeled way from the resin film strip 38 after passing through guides 82, immediately before being compacted against the substrate 44. The compaction control 85 as well as other functions of the end effector 26 may be controlled by the controller 30 as shown in FIG. 1.

Figure 4:
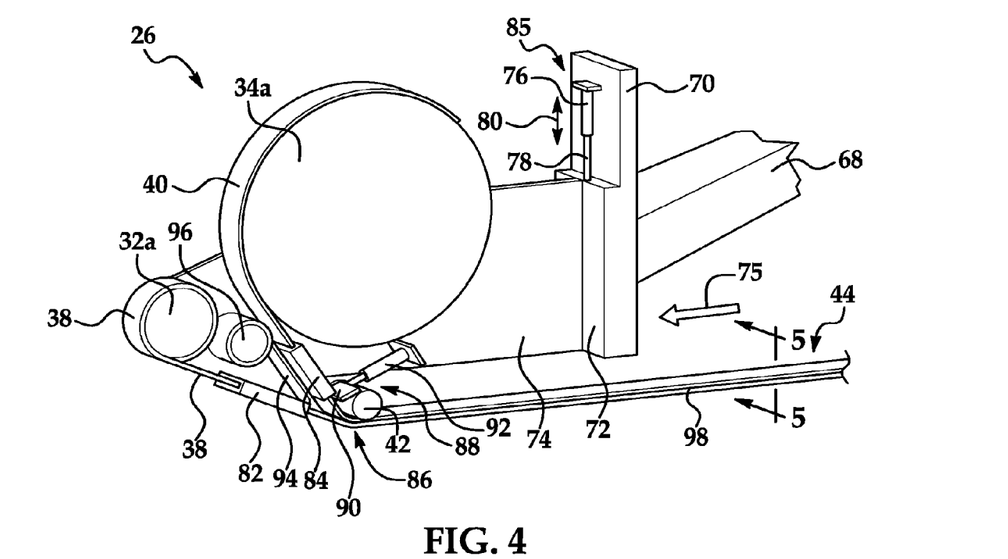
FIG. 4 is an illustration of a perspective view of one embodiment of the end effector forming part of the apparatus shown in FIG. 3.

FIG. 4 illustrates additional details of one embodiment of the end effector 26. Creels 32a, 34a, take-up reel 96 and cutting mechanism 88 are mounted on a frame 74. The frame 74 includes a plate 72 that is slideably mounted on a second plate 70 secured to an arm 68 of the manipulator 27. A pneumatic cylinder 76 secured to plate 70 has an output shaft 78 coupled with plate 72. The pneumatic cylinder 76 moves plate 72 and thus the frame 74 in the direction shown by arrow 80 toward or away from the substrate 44.

The sliding assembly of the plates 70, 72 along with pneumatic cylinder 76 provide a compaction control 85 that allows the compaction pressure applied by the roller 42 to be adjusted. A resin film strip 38 drawn from the creel 32a passes through a guide 82 which directs the resin film strip 38 to a nip 86 between the compaction roller 42 and the substrate 44. The resin film strip 38 may include a backing paper 94 to prevent the wound layers of the resin film 38 on the spool 32 (FIG. 1) from adhering to each other. The backing paper 94 is peeled away from the resin film 38 after the latter passes through the guide 82, and is wrapped around the take-up reel 96.

The creels 32a, 34a are substantially aligned with each other in the direction of travel 75 of the end effector 26 over the substrate 44, such that the resin film strip 38 and the fiber reinforcement strip 40 overlap and are substantially aligned with each other when deposited and consolidated onto the substrate 44 by the compaction roller 42. Strips 38, 40 are drawn from the creels 32a, 34a at substantially the same rate and respectively pass through guides 82, 84 which direct the strips 38, 40 in overlying relationship into the nip 86. The cutting mechanism 88 may comprise a pneumatic cylinder 92 secured to the frame 74 which reciprocates a cutting blade 90. The cutting blade 90 simultaneously cuts the strips 38, 40 to the desired lengths.

The resin film strip 38 is consolidated by the compaction roller 42 beneath the dry fiber strip 40. The tackiness of the resin film strip 38 serves as an adhesive which forms a moderate bond with the substrate 44 and the fiber 40 under which it is placed. In some embodiments, depending on the particular resin system that is employed, it may be necessary or desirable to heat the resin film strip 38 to increase its tackiness as it enters the nip 86. This heating process may be achieved using any of a variety of techniques and devices, such as without limitation, an infrared heater, a gas torch or a laser (all not shown). The areal weight of the resin film strip 38 may be predefined to control the fiber volume fraction of the cured structure 20 (FIG. 1). Although not shown in FIG. 4, the guides 82, 84 may incorporate roller drives which initially draw strips 38, 40 from the creels 32a, 34a until the strips enter the nip 86. Once the strips 38, 40 enter the nip 86, movement of the end effector 26 draws the strips 38, 40 from the creels 32a, 34a and the roller drives may be de-energized. Additional details of guides, rollers, threading mechanisms and drives for controlling the path and movement of the strips 38, 40 on the end effector 26 may be found in U.S. Pat. Nos. 4,699,683 and 7,213,629, US Patent Publication No. 20070029030A1 published Feb. 8, 2007 and in U.S. patent application Ser. No. 12/038,155 filed Feb. 27, 2008, all of which patents and applications are incorporated by reference herein.

In the embodiment shown in FIG. 4, a double layer strip 98 is laid down on the substrate 44 in which resin film strip 38 is sandwiched between the substrate 44 and the overlying fiber reinforcement strip 40. This arrangement allows layup of interleafed resin layers 50 and fiber reinforcement plies 52 to form the layup 48b shown in FIG. 1. The end effector 26 shown in FIG. 4 may also be used to lay up single layer strips 98 comprising only the resin film strip 38 or only the fiber reinforcement strip 40 by controlling the drives previously discussed in connection with the guides 82, 84, and/or by removing one of the spools 32, 34 (FIG. 3) from the creels 32a, 34a.

Figures 5, 6:
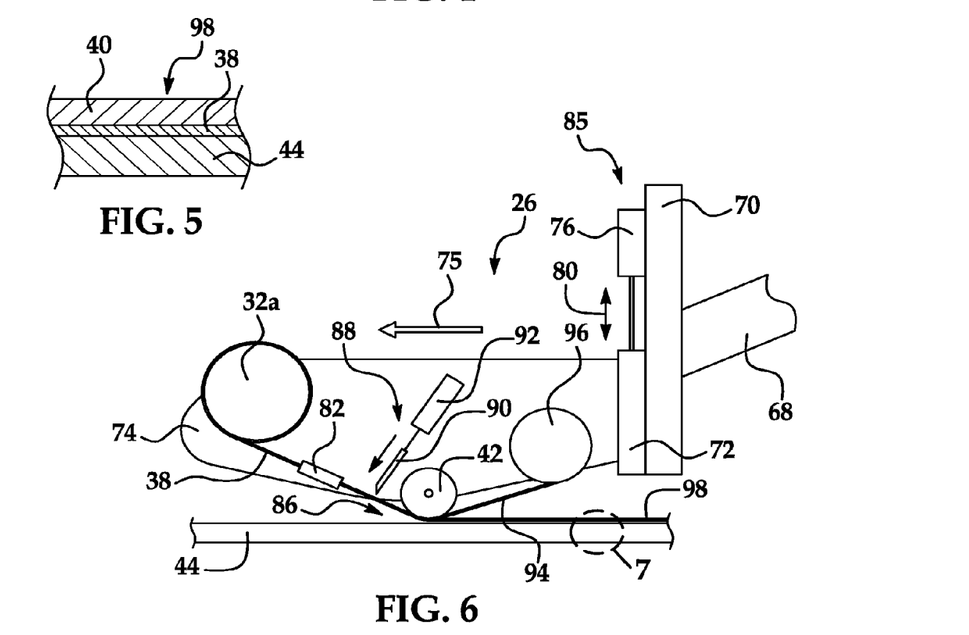
FIG. 5 is an illustration of a sectional view taken along the line 5-5 in FIG. 4.
FIG. 6 is an illustration of a side view of another embodiment of the end effector.
Figure 7:
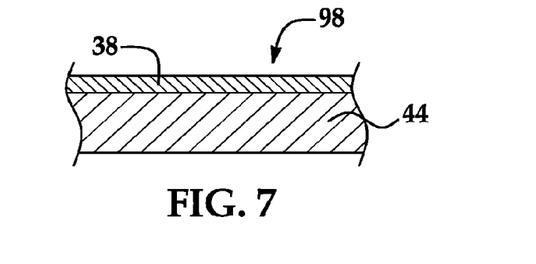
FIG. 7 is an illustration of the area designated as "FIG. 7" in FIG. 6.

FIG. 6 illustrates an alternate embodiment of the end effector 26, similar to that shown in FIG. 4, but which is dedicated to laying down courses 98 of the resin film 38 on a substrate 34, which may be a dry fiber preform. As previously mentioned, the substrate 44 may comprise a tool 22, a layer 50 of previously laid resin film (FIG. 2) or a ply 52 of a fiber reinforcement. A resin film strip 38 drawn from a creel 32a passes through a guide 82 which directs the strip 38 to the nip 86 between the substrate 44 and a compaction roller 42 which compacts the strip 38 against the substrate 44. A take up reel 96 takes up a backing paper 94 which is peeled away from the strip 38 after the strip 38 has been consolidated under the compaction roller 42. This reduces the possibility of the roller 42 becoming gummed by the resin and allows easier cutting of the strip 38. FIG. 7 illustrates a resin film strip after 38 having been deposited and compacted against the substrate 44, after the backing paper 94 has been peeled away.

Figure 8:
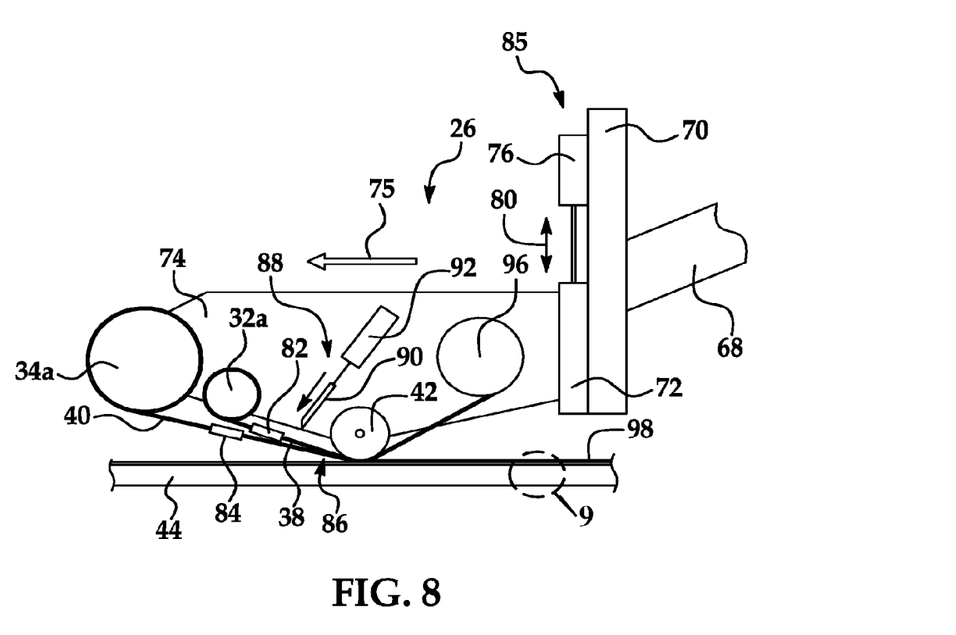
FIG. 8 is an illustration of a side view of a further embodiment of the end effector.
Figure 9:
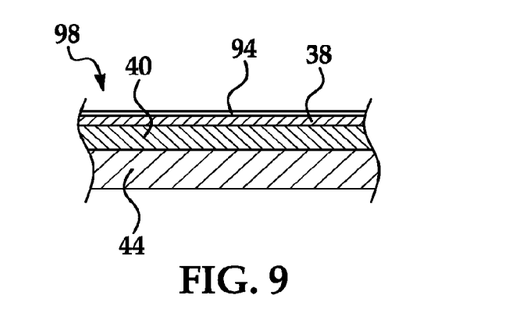
FIG. 9 is an illustration of the area designated as "FIG. 9" in FIG. 8.

FIG. 8 illustrates a further embodiment of the end effector 26 which may be used to lay down multi-layer courses 98 in which the fiber reinforcement 30 is disposed between the substrate 44 and the resin film 38 as shown in FIG. 9. In this embodiment, the creels 32a, 34a are positioned on the frame 74 such that the fiber strip 40 is positioned between the resin film strip 38 and the substrate 44 as it enters the nip 86 between the compaction roller 42 and the substrate 44. The backing paper 94 may remain on the resin film strips 38 and be peeled away at a later time, thereby reducing the possibility of the resin coming into contact with personnel. Following removal of the backing paper 94, the exposed layer 50 (FIG. 1) formed by the deposited resin film strips 38 provides a tacky surface to which a dry fiber preform or other substrate may adhere. Alternatively, in another embodiment, the backing paper 94 may be peeled away on the fly and rolled onto a take up reel 96.

Figure 10:
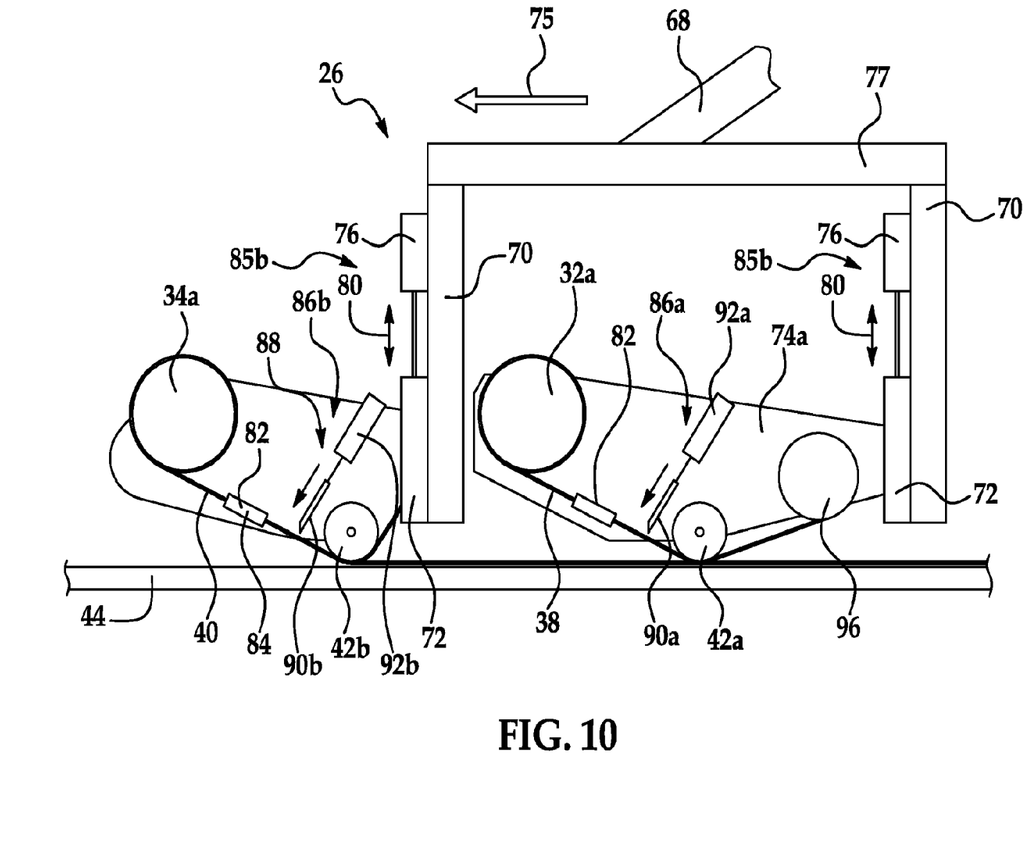
FIG. 10 is an illustration of still another embodiment of the end effector.

Attention is now directed to FIG. 10 which illustrates still another embodiment of the end effector 26. In this embodiment, creels 32a, 34a are located on separate frames 74a, 74b which are mounted on a common support 77 connected to an arm 68 of the manipulator 27. The creels 32a, 34a are aligned with each other in the direction of travel 75 and respectively feed resin film strips 38 and fiber reinforcement strips 40 to independent compaction rollers 42a, 42b. Cutting mechanisms 86a, 86b are mounted on the frames 74a, 74b for independently cutting the strips 38, 40 to the desired lengths. Separate compaction controls 85a, 85b between the frames 74a, 74b and the common support 77 allow the compaction force applied by the rollers 42a, 42b to be adjusted independently of each other. In the embodiment shown in FIG. 10, the fiber strips 40 are deposited before the resin strips 38, however, by reversing the position of the two frames 74a, 74b, the resin strips may be deposited before the fiber strips 40 are deposited.

Figure 11:
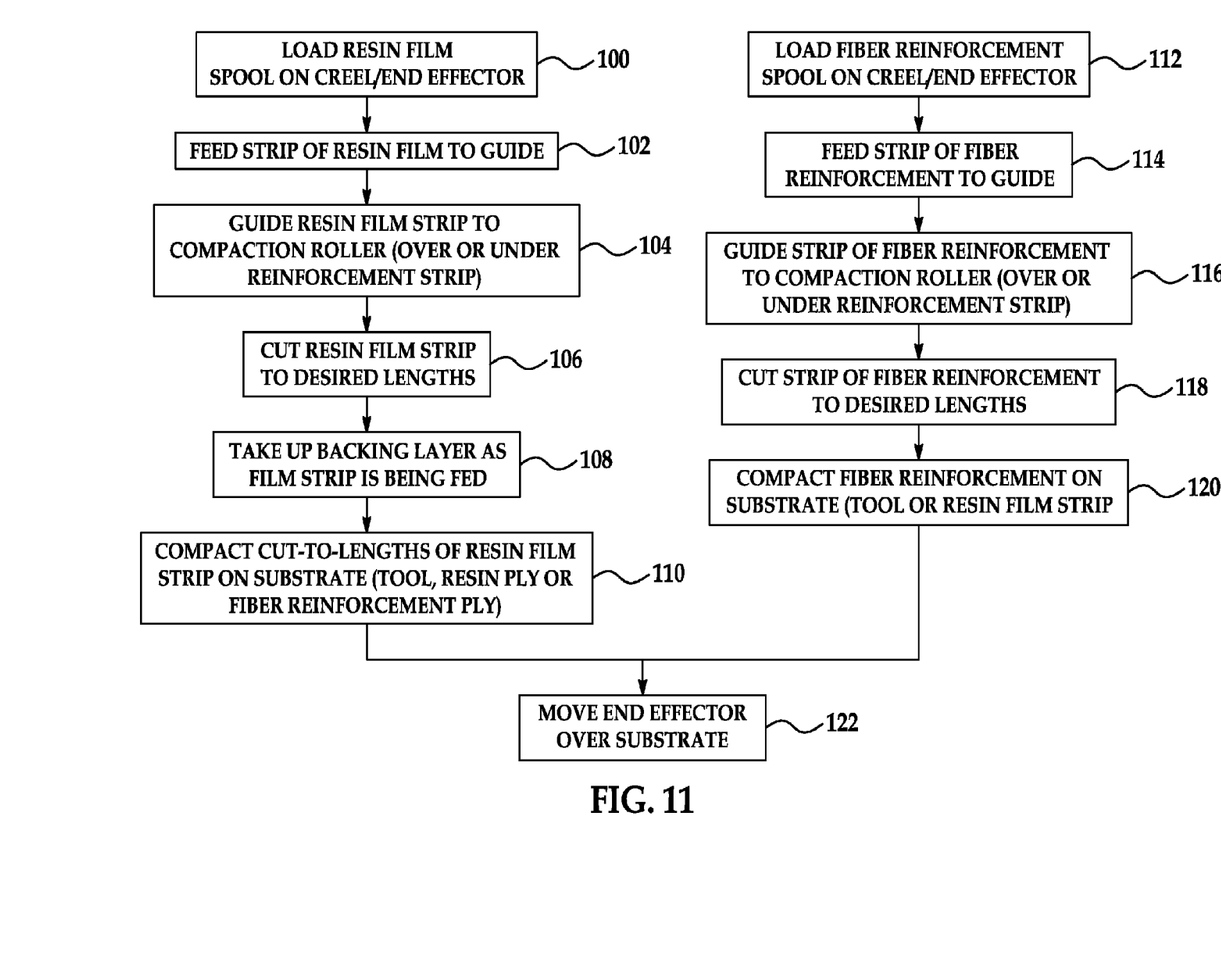
FIG. 11 is an illustration of a flow diagram of a method of forming the layups shown in FIG. 1 using the disclosed end effector.

Attention is now directed to FIG. 11 which illustrates the steps of a method of depositing resin film, and optionally for depositing fiber reinforcement along with the deposited resin film. Beginning at step 100, a spool 32 of resin film is loaded into a creel 32a on an end effector 26. Depending on the particular resin system that is used, it may be necessary or desirable to refrigerate or otherwise cool the spool 32 and/or creel 32a prior to use. At 102, a strip 38 of the resin film is fed to a guide 82 and at 104, the guide 82 is used to guide the resin film strip 38 to a compaction roller 42. In those applications where a fiber reinforcement strip 40 is also being deposited, the resin film strip 38 may be guided under or over the reinforcement fiber strip 40. At 106, the resin film strip 38 is cut to the desired length as it is being drawn from the creel 34a.

At 108, the backing paper 94 from the resin film strip 38 may be optionally removed and taken up on a take-up reel 96 as the resin film strip 38 is being compacted against the substrate 44 by the compaction roller 42. At 110, the compaction roller 42 is used to compact the cut-to-length strips 38 of resin film onto the substrate 44, which as previously discussed, may comprise tooling 22, a previously laid layer of resin 50, or a previously laid ply 52 of fiber reinforcement. At 122, the end effector 26 is moved over the substrate 44 in order to lay down a strip 38 of the resin film and compact the strip 38 against the substrate 44. Depending on the particular resin system that is employed, it may be necessary to heat the resin film strip 38 immediately prior to its compaction against the substrate 44 so that the film strip 38 possesses the desired tackiness needed to cause it to adhere to the substrate 44 during the compaction process.

Optional steps 112-120 may be carried out in order to layup strips 40 of fiber reinforcement as the resin film strips 38 are being laid down on the substrate 44. Beginning at 112, a spool of fiber reinforcement is loaded into a creel 34a on the end effector 26. At 114, a strip 40 of the fiber reinforcement is fed to a guide 84. The guide 84 directs the fiber reinforcement strip 40 to the compaction roller 42, either over or beneath the resin film strip 38. At 118, the fiber reinforcement strip 40 is cut to the desired length and is compacted on the substrate 44 at step 120.

Figure 12:
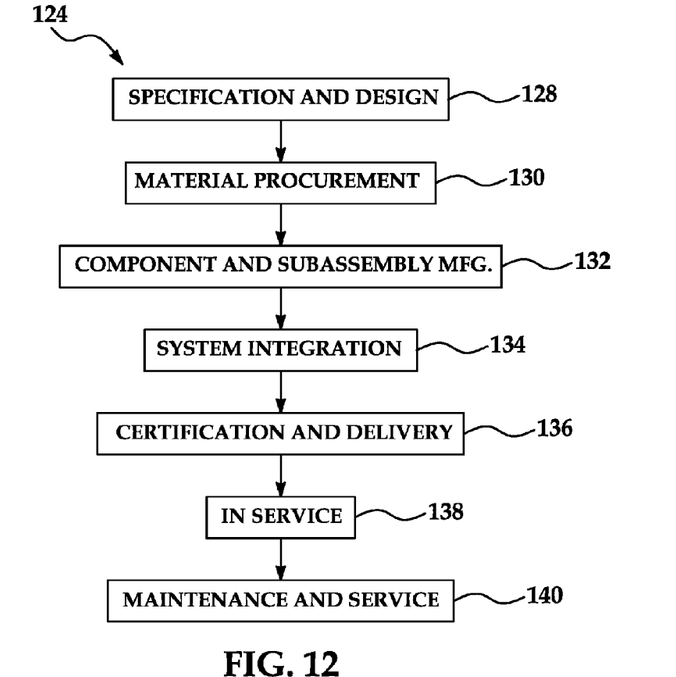
FIG. 12 is an illustration of a flow diagram of aircraft production and service methodology.
Figure 13:
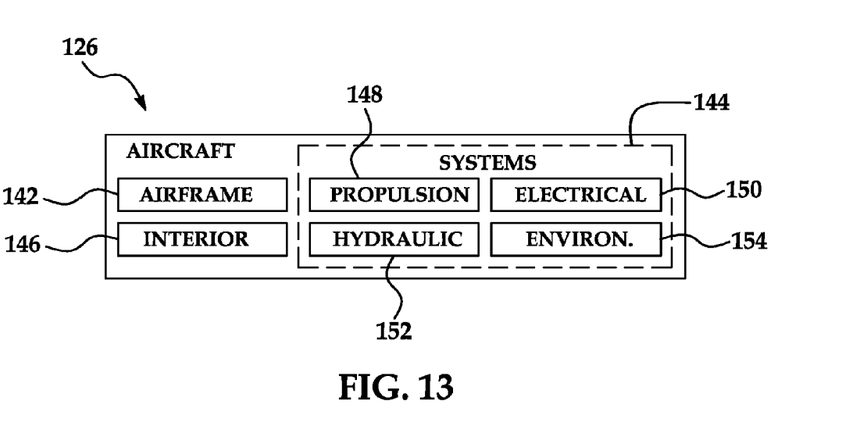
FIG. 13 is an illustration of a block diagram of an aircraft.

Embodiments of the disclosure may find use in a variety of potential applications, particularly in the transportation industry, including for example, aerospace, marine and automotive applications. Thus, referring now to FIGS. 12 and 13, embodiments of the disclosure may be used in the context of an aircraft manufacturing and service method 124 as shown in FIG. 12 and an aircraft 126 as shown in FIG. 13. Aircraft applications of the disclosed embodiments may include, for example, without limitation, composite stiffened members such as fuselage skins, wing skins, control surfaces, hatches, floor panels, door panels, access panels and empennages, to name a few. During pre-production, exemplary method 124 may include specification and design 128 of the aircraft 126 and material procurement 130. During production, component and subassembly manufacturing 132 and system integration 134 of the aircraft 126 takes place. Thereafter, the aircraft 126 may go through certification and delivery 136 in order to be placed in service 138. While in service by a customer, the aircraft 126 is scheduled for routine maintenance and service 140 (which may also include modification, reconfiguration, refurbishment, and so on).

Each of the processes of method 124 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 13, the aircraft 126 produced by exemplary method 124 may include an airframe 142 with a plurality of systems 144 and an interior 146. Examples of high-level systems 144 include one or more of a propulsion system 148, an electrical system 150, a hydraulic system 152, and an environmental system 154. Any number of other systems may be included. Although an aerospace example is shown, the principles of the disclosure may be applied to other industries, such as the marine and automotive industries.

Systems and methods embodied herein may be employed during any one or more of the stages of the production and service method 124. For example, components or subassemblies corresponding to production process 132 may be fabricated or manufactured in a manner similar to components or subassemblies produced while the aircraft 126 is in service. Also, one or more apparatus embodiments, method embodiments, or a combination thereof may be utilized during the production stages 132 and 134, for example, by substantially expediting assembly of or reducing the cost of an aircraft 126. Similarly, one or more of apparatus embodiments, method embodiments, or a combination thereof may be utilized while the aircraft 126 is in service, for example and without limitation, to maintenance and service 140.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A method of fabricating a composite structure, comprising:
   feeding a strip of unreinforced resin film to a first compaction roller;
   feeding a strip of dry fiber reinforcement to a second compaction roller;
   moving the compaction rollers along a surface of a substrate;
   independently controlling compaction pressure applied by the first compaction roller to the strip of unreinforced resin film and the second compaction roller to the strip of dry fiber reinforcement, respectively; and
   using the first compaction roller and the second compaction roller to compact cut lengths of dry fiber reinforcement and strips of unreinforced resin film against the substrate.

2. The method of claim 1, wherein feeding the unreinforced resin film includes:
   guiding a strip of the unreinforced resin film to the first compaction roller; and
   cutting the strip of unreinforced resin film to desired lengths as the first compaction roller moves along the surface of the substrate.

3. The method of claim 1, further comprising:
   feeding the dry fiber reinforcement from a second spool to the second compaction roller and separately feeding the unreinforced resin film from a first spool; and
   guiding the unreinforced resin film and the dry fiber reinforcement such that the unreinforced resin film and the dry fiber reinforcement are positioned in a substantially aligned and overlapping relationship.

4. The method of claim 1, further comprising:
   cutting the strip of dry fiber reinforcement to desired lengths as the second compaction roller moves along the surface of the substrate.

5. The method of claim 1, wherein:
   the unreinforced resin film is fed to the first compaction roller as strips of unreinforced resin film; and an automatically controlled manipulator is used to move the first compaction roller along the surface of the substrate and place the strips of unreinforced resin film substantially edge-to-edge.

6. The method of claim 1, wherein the unreinforced resin film consists essentially of resin and toughening agents.

7. The method of claim 1, wherein the unreinforced resin film comprises a backing and further comprising removing the backing from the unreinforced resin film and rolling the backing onto a take up roll.

8. The method of claim 1 further comprising heating the unreinforced resin film on the substrate.

9. The method of claim 1, wherein the step of compacting the unreinforced resin film comprises moving a frame connected to the first compaction roller.

10. The method of claim 1, wherein the unreinforced resin film excludes a fiber reinforcement.

11. The method of claim 1, further comprising:
drawing the strip of unreinforced resin film from a first spool prior to feeding the strip of unreinforced resin film;
drawing the strip of dry fiber reinforcement from a second spool prior to feeding the strip of dry fiber reinforcement; and
cutting the strips of unreinforced resin film and dry fiber reinforcement to desired lengths.

12. A method of fabricating a composite structure, comprising:
drawing a strip of resin film from a spool of resin film to a first compaction roller, the resin film excluding fiber reinforcement;
drawing a strip of dry fiber reinforcement from a spool of dry fiber reinforcement to a second compaction roller;
moving the first compaction roller and the second compaction roller over a tool so as to assemble a layup on the tool, including at least one ply of dry fiber reinforcement on the tool and at least one layer of resin film on the tool;
independently controlling compaction pressure applied by the first compaction roller to the strip of resin film and the second compaction roller to the strip of dry fiber reinforcement, respectively;
using the first compaction roller and the second compaction roller to compact cut lengths of dry fiber reinforcement and strips of resin film against the tool; and
infusing the dry fiber reinforcement with resin from the resin film.

13. The method of claim 12, wherein infusing the dry fiber reinforcement includes:
sealing a vacuum bag over the layup;
evacuating the vacuum bag; and
applying heat to the layup.

14. The method of claim 12, wherein the spool of the dry fiber reinforcement is located on an end effector.

15. A method of laying up a composite aircraft structure, comprising:
moving an end effector over a surface of a tool;
using a programmed manipulator to automatically control movement of the end effector over the surface of the tool;
drawing a strip of resin film from a spool of resin film on the end effector, the resin film excluding fiber reinforcement;
cutting the strip of resin film to a first desired length forming a cut length of resin film;
removing a backing from the resin film and rolling the backing onto a take up reel;
drawing a strip of dry fiber reinforcement from a spool of the dry fiber reinforcement on the end effector;
cutting the strip of dry fiber reinforcement to a second desired length forming a cut length of the dry fiber reinforcement;
feeding the cut length of the resin film strip to a first roller;
using the first roller to compact the cut length of the resin film strip against the tool;
feeding the cut length of the dry fiber reinforcement to a second roller;
using the second roller to compact the cut length of the dry fiber reinforcement against the tool in alignment with the compacted strip of resin film; and
independently controlling compaction pressure applied by the first and second rollers to the strip of resin film and the strip of dry fiber reinforcement, respectively.

* * * * *